United States Patent Office 2,915,318
Patented Dec. 1, 1959

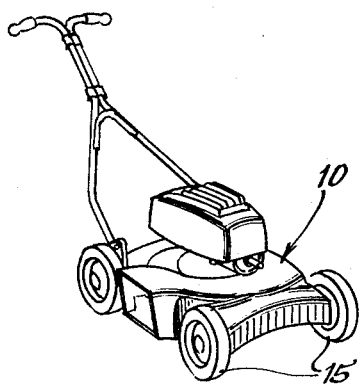
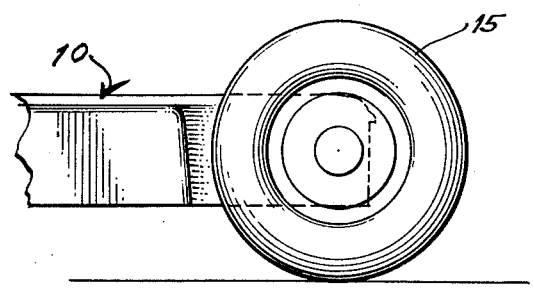
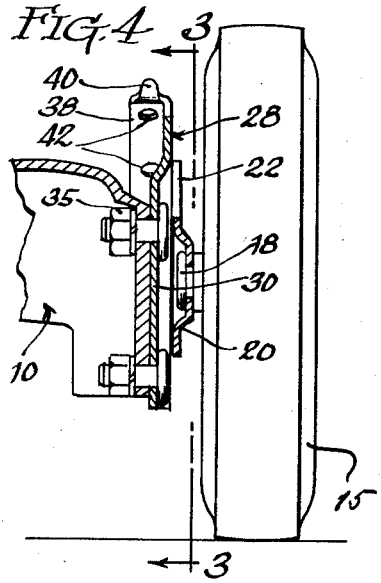
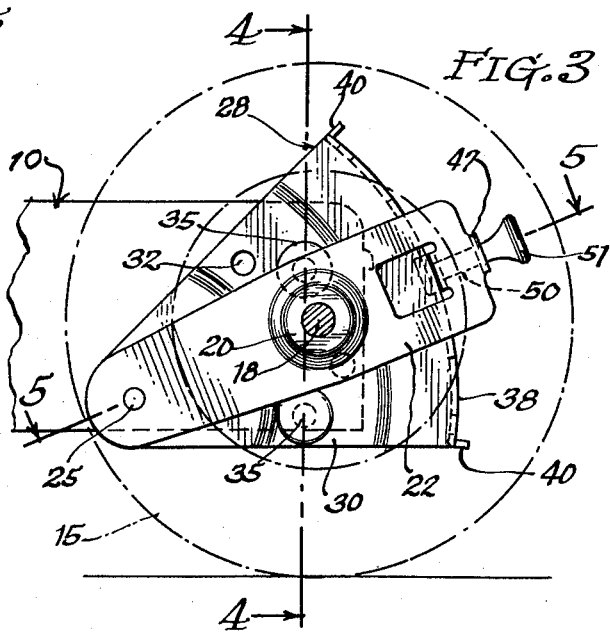
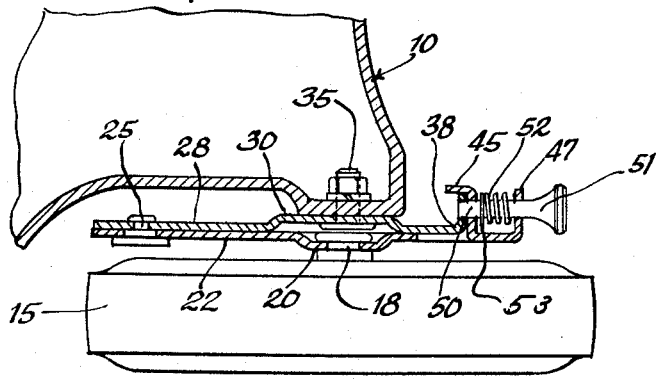

2,915,318

ADJUSTABLE WHEEL MOUNTING FOR LAWN-MOWER AND THE LIKE

Cecil E. Chesser, Hebron, Ohio, assignor to Sears, Roebuck and Co., Chicago, Ill., a corporation of New York Application February 20, 1957, Serial No. 641,377

3 Claims. (Cl. 280—43)

My invention relates to adjustable wheel mountings for agricultural implements, such as a lawnmower, wherein it is desirable to adjust the elevation of the tool relative to the ground.

My invention is especially designed for use in connection with a lawnmower of the power driven type, although it is not necessarily restricted to such a device but may be employed on a wide variety of implements embodying a tool which functions in, on or slightly above the surface of the earth and wherein the operator may desire to adjust the elevation of said tool relative to the earth's surface. The most convenient way of effecting such an adjustment is by changing the elevation of the wheels relative to the tool.

My invention contemplates an extremely simple arrangement comprising a bracket which is so designed that it may be interchangeably attached to the right or left hand side of the implement, thus saving tool costs, which bracket has a wheel pivotally mounted thereon, and which may be angularly adjusted by a quick and simple manual operation without the need for any hand tool.

A particular object is to provide such an adjustment device adapted for quick attachment to a mower or other tool not equipped at the factory with such adjusting means.

Another object is to provide a device of the character referred to which is simple and inexpensive in construction, easily attached to the implement, rugged and foolproof in operation.

Various other objects and advantages will become apparent as the description proceeds.

Referring now to the drawings forming a part of this application and illustrating a preferred embodiment of my invention, Fig. 1 is a perspective view of a typical lawnmower to which my invention may be applied;

Fig. 2 is a fragmentary elevational view on an enlarged scale showing the forepart of the implement illustrated in Fig. 1;

Fig. 3 is a fragmentary elevational view on a further enlarged scale of a wheel mounting device embodying my invention taken substantially along line 3—3 of Fig. 4, with a portion of the implement shown fragmentarily and the wheel shown in dot-dash lines;

Fig. 4 is a fragmentary sectional view taken substantially along the line 4—4 of Fig. 3, with the wheel shown in elevation, and Fig. 5 is a sectional view taken substantially along the line 5—5 of Fig. 3.

The numeral 10 indicates in general a motor driven lawnmower or other implement to which my invention is applied, it being understood that a mower of this type normally includes a motor, a shearing device actuated by the motor and moving in a substantially horizontal plane, a handle for guiding the implement and wheels 15 supporting the implement and normally resting on the surface of the earth. Obviously, my invention may be utilized in conjunction with other types of implements.

It will be understood that in a mower the shearing element is ordinarily disposed between the front wheels 15 and, hence, adjustment of these wheels vertically relative to the shearing means will result in modifying the elevation of the latter relative to the earth's surface. The same situation would apply if some other type of tool were substituted for the shearing means.

A wheel 15 is provided with an axle 18 which is journaled in a bearing element 20 provided in an arm 22. This arm is pivotally attached as by a stud 25 to a sector plate 28, both the arm 22 and the plate 28 being preferably stamped out of sheet metal or other suitable material. Said sector plate 28 lies for the most part in one major plane, having an annular portion 30 embossed away from the arm 22.

A plurality of bolt holes 32 are provided in the annular embossed portion 30 whereby the adjusting device may be secured to the mower or other implement to which it is to be attached. Thus, as seen in Figs. 4 and 5, bolts and nuts, indicated generally by the numeral 35, extend through apertures 32 and through similarly spaced apertures provided in the body of implement member 10.

The arcuate end of sector member 28 is bent away from arm 22 at substantially right angles to the major plane of said sector member to provide a flange 38, said flange being provided at the ends thereof with a pair of outwardly extending ears or stops 40. Said flange is provided with a plurality of apertures 42 for engaging a suitable detent provided on the arm 22.

Said arm 22 has a flanged finger 45 struck out therefrom, said finger being of approximately L formation so as to override the flange 38. Said arm also has an ear 47 extending substantially parallel to a portion of the finger 45, said ear 47 and finger 45 being alined with the apertures 42 of flange 38 through which extends a stud 50 having an enlarged head or manipulating member 51, as seen best in Fig. 5. A compression spring 52 is disposed on the stud 50 whereby the stud is urged into a position extending through the apertures 42 in flange 38, by reaction of the spring against collar 53 fixed on the stud.

It will be seen that by grasping the knob 51 of stud 50 and moving it against the action of the spring 52 out of an aperture 42, the arm and wheel 15 carried thereby may be adjusted angularly with reference to sector element 30 and hence with reference to the implement, thus effecting a change in elevation of the shearing means or other tool carried by the implement, relative to the ground.

It will also be apparent that the same wheel mounting device may be attached interchangeably to either side of the implement, thus effecting a substantial saving in tool costs and consequently in the cost of production. This interchangeability is permitted by providing four bolt holes 32 in the sector member, two of which are used for mounting on one side of the implement, the other two for the other side.

Various changes coming within the spirit of my invention may suggest themselves to those skilled in the art. Hence, I do not wish to be limited to the specific embodiment shown and described or uses mentioned, but intend the same to be merely exemplary, the scope of my invention being limited only by the appended claims.

I claim:

1. In combination with a wheeled agricultural implement having a tool with a housing therefor, means independent of said housing for adjustably supporting a wheel at varying levels relative to said tool and housing and the consequent spacing of the latter from the ground, comprising a pair of arms pivotally mounted together adjacent to one of the ends of each arm for relative movement in parallel planes, one of said arms attached to the side of said housing and having an arcuate outline at the end thereof opposite its pivotal end and provided with a plurality of spaced recesses on said arcuate end, the other one of said arms extending beyond the arcuate end of said first arm and having a spring-biased detent in said extended portion adapted selectively to engage one of said recesses, and a wheel journalled between said detent and the pivoted end of said last-mentioned arm and disposed on the side thereof remote from said first-mentioned arm, said first-mentioned arm being provided with a plurality of openings on the opposite sides of the longitudinal median thereof to adapt the wheel support for interchangeable mounting to either side of the housing.

2. In combination with a wheeled agricultural implement having a tool with a housing therefor, means independent of said housing for adjustably supporting a wheel at varying levels relative to said tool and housing and the consequent spacing of the latter from the ground, comprising a pair of arms pivotally mounted together adjacent to one of the ends of each arm for relative movement in parallel planes, one of said arms attached to the side of said housing and having an arcuate outline at the end thereof opposite its pivotal end and provided with a plurality of spaced recesses on said arcuate end, the other one of said arms extending beyond the arcuate end of said first arm and having a spring-biased detent in said extended portion adapted selectively to engage one of said recesses, a wheel journalled between said detent and the pivoted end of said last-mentioned arm and disposed on the side thereof remote from said first-mentioned arm, said detent comprising a rod-like member slidably disposed in a pair of longitudinally spaced flanges formed on said other arm and extending toward the plane of said first arm, both flanges consisting of a portion of the body of said other arm, one of said flanges being disposed at the end of said other arm and the other flange having a portion cooperating with the first arm for retaining the two arms in generally parallel planes, a coil spring disposed on said rod-like member between said flanges and urging the detent toward the pivotal end of the arms, and said member having a manipulating element on the outer end thereof.

3. In combination with a wheeled agricultural implement having a tool with a housing therefor, means independent of said housing for adjustably supporting a wheel at varying levels relative to said tool and housing and the consequent spacing of the latter from the ground, bolt means for detachably connecting said means to said housing, said first-mentioned means comprising a unitary assembly composed of a pair of arms pivotally mounted together adjacent to one of the ends of each arm for relative movement in parallel planes with the pivotal junction between said arms being free and disconnected from said housing, one of said arms attached to the side of said housing by said bolt means and having an arcuate outline at the end thereof opposite its pivotal end and provided with a plurality of spaced recesses on said arcuate end, the other one of said arms extending beyond the arcuate end of said first arm and having a spring-biased detent in said extended portion movable in a radial direction and adapted selectively to engage one of said recesses, and a wheel journalled on said other arm between said detent and the pivoted end of said last-mentioned arm and disposed on the side thereof remote from said first-mentioned arm.

References Cited in the file of this patent

UNITED STATES PATENTS

| | | |
|---|---|---|
| 442,261 | Sughroue | Dec. 9, 1890 |
| 895,721 | Broome | Aug. 11, 1908 |
| 1,304,783 | Lederer | May 27, 1919 |
| 1,391,948 | Gledhill | Sept. 27, 1921 |
| 1,392,299 | Carlson | Oct. 4, 1921 |
| 1,599,218 | Dougherty | Sept. 7, 1926 |
| 2,016,436 | Jahnke | Oct. 8, 1935 |
| 2,529,797 | Cauble | Nov. 14, 1950 |
| 2,722,432 | Roberton | Nov. 1, 1955 |
| 2,862,721 | Wehner | Dec. 2, 1958 |